United States Patent [19]

Dyki

[11] 4,060,878
[45] Dec. 6, 1977

[54] BUCKLE SWITCH

[75] Inventor: Joseph J. Dyki, Romeo, Mich.

[73] Assignee: The Firestone Tire & Rubber Company, Akron, Ohio

[21] Appl. No.: 623,665

[22] Filed: Oct. 20, 1975

[51] Int. Cl.² .................. H01H 3/16; A44B 11/25
[52] U.S. Cl. ....................... 24/230 A; 200/61.58 B;
340/52 E; 307/10 SB
[58] Field of Search ....... 24/230 A, 230 AT, 230 AP,
24/230 AL, 230 AV; 340/278, 52 E; 180/82 C;
307/105 B; 200/61.58 B

[56] References Cited

U.S. PATENT DOCUMENTS

| | | | |
|---|---|---|---|
| 2,868,309 | 1/1959 | Burgess | 200/61.58 B UX |
| 3,766,612 | 10/1973 | Hattori | 24/230 A |
| 3,833,781 | 9/1974 | Rumpf | 200/61.58 B |
| 3,840,849 | 10/1974 | Lohr | 340/52 E |
| 3,890,003 | 6/1975 | Close | 200/61.58 B X |
| 3,956,603 | 5/1976 | Fisher | 200/61.58 B |

*Primary Examiner*—Paul R. Gilliam
*Assistant Examiner*—Victor N. Sakran
*Attorney, Agent, or Firm*—Miller, Morriss and Pappas

[57] ABSTRACT

A buckle switch is described for use in automotive safety belt applications which is slidably located inside the buckle and in which an actuator is pivotally operated by the insertion of the tongue of the buckle. The tongue enters the buckle and engages the switch actuator so as to pivot the actuator and its contactor bar into camming wiping engagement or disengagement with a pair of leads supported in a resin case and which resin case also pivotally supports the actuator element. The leads provide an orienting bias against the actuator which restores the original condition of the switch upon release and withdrawal of the tongue from the buckle. The resin case is supported in the buckle by sliding contact with the web floor of the channel shaped buckle housing and detent means secures the resin case to the belt slot and buckle extension. An extension of the buckle cover closes on the resin case assuring top and lateral location support.

2 Claims, 10 Drawing Figures

BUCKLE SWITCH

The present invention is a substantially improved low profile buckle switch which is preassembled into a resin support case for insertion in a buckle housing or frame. The resin switch case supports the lead wires and the lead contacts and orients the lead contacts so as to serve as bias means or springs in orientation of the actuator element pivotally supported therein. Hence, the buckle at rest includes an actuator element which presents an interference face to the entry of the buckle tongue. When the buckle tongue enters the buckle frame or housing and approaches latch position, the tongue engages the actuator face and displaces the actuator element so that the actuator rotates or pivots on its axis and the motion results in selected wiping action as an actuator contact is rocked selectively into and out of engagement with the lead contacts. This assures exceptionally long life and clean surface contacts in general avoidance of arcing. The flexure of the lead contacts is such as to assure minimum wear and minimum shear at engagement. The construction is simple, the switch can be converted from normally open to normally closed by the simple expedient of exchanging actuators. This latter consequence allows the buckles using the buckle switch to be used in either a normally open or normally closed environment as selected in accord with a particular signal circuit or ignition interlock by a particular automotive manufacturer. For example, in a given vehicle both normally open and normally closed switches may be used without restyling one or the other because of functional limitations and the same switch case is useable for both normally open and normally closed switches.

Accordingly, the principal object is to provide a new and improved safety buckle switch.

Another object is to teach a preassembled encasement for buckle switches which is easily inserted in seat belt buckles as desired.

Another object is to provide a switch for safety buckles which is convertible from normally open to normally closed by changing only the actuator.

Another object is to provide a safety buckle switch in which the spring bias on the actuator is supplied by the lead contactors supported in a resin case.

Other objects including compactness, low profile, economy of manufacture and assembly and consistency of performance will be easily appreciated by those skilled in the art as the description proceeds.

In a very general way buckle switches for actuation of signals and of interlock apparatus are well known in the safety belt art and such art is early characterized for example by F. J. Simon in U.S. Pat. No. 2,802,073, by J. J. McCarthy in U.S. Pat. No. 2,996,587, by McDonald in U.S. Pat. No. 3,237,710, and by O. W. Boblitz in U.S. Pat. No. 3,504,336. More recently the work of L. J. Nevett seen in U.S. Pat. No. 3,760,135 and H. Hattori in his U.S. Pat. No. 3,766,612 show variant approaches to providing switches in buckles. None show or suggest the presently considered structure.

IN THE DRAWINGS

In the drawings, the

GENERAL DESCRIPTION

Figure 1:
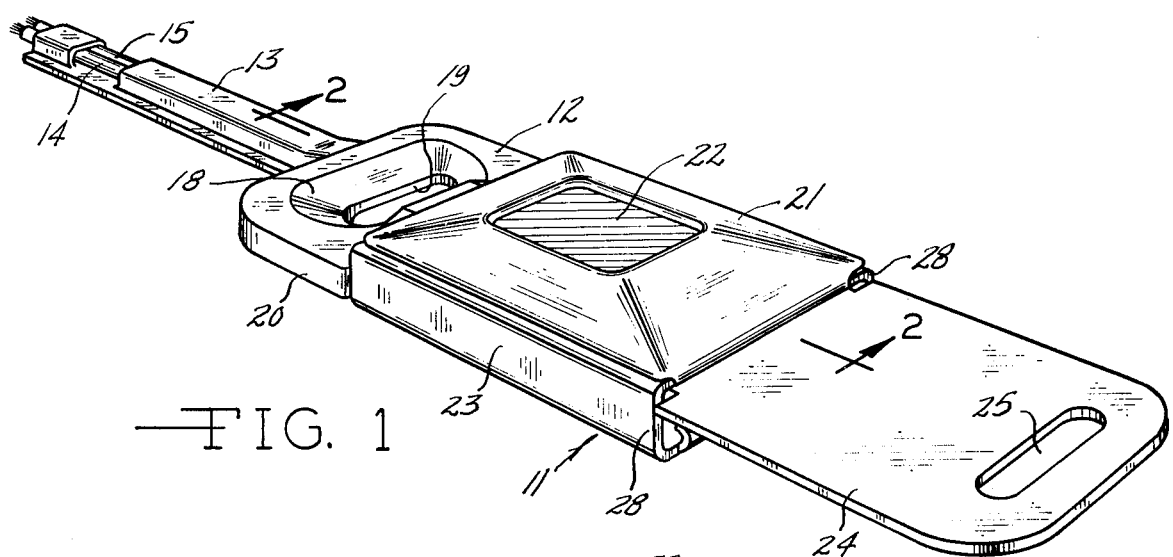
FIG. 1 is a perspective view of an automotive safety belt buckle equipped with a buckle switch in accord with the present invention.

In general, a low profile resin switch case is provided which is precision injection molded and which is slidably insertable and fitted in a seat belt buckle housing. Means integral with the switch case allow the structure to be snapped into position and be restrained from disengagement as for example, by detents or deformable extensions which selectively engage and disengage portions of the buckle housing and extensions such as the web connecting tab. The resin switch case includes an integral entry lead support portion or channel, an integral contactor support portion having suport orifices and adjacent buttresses as fulcrums and an integral actuator support portion which includes journalling means and which is gated at the end to allow ease of assembly of the actuator to the switch case.

The entry lead support portion receives a pair of electrical leads and conducts them in channels to the contactor support portion. A pair of blade-like contactors are secured to the ends of the electrical leads and these nest in the lead channels and the blade portions protrude through apertures or orifices into the actuator support portion of the switch case and are there oriented in parallel spaced-apart relation and are supported against collapse by the buttresses serving as fulcrums. The resin actuator (non-conducting) is pivotally supported in the fulcrum mounts of the actuator support portion of the switch case and a portion thereof is extended above the level of the actuator support portion of the switch case and another cam portion of the actuator profile slightly depresses the contactor blades so as to cause a bias of the actuator to the extended position. The mounting of the blades is a cantilever type mounting. This places the actuator in an interference position with the buckle tongue so that as the buckle is latched the tongue of the buckle rotates and displaces the actuator. A contactor bar through the body of the actuator is eccentric with respect to the axis of rotation of the actuator. Displacement of the actuator causes corresponding angular displacement of the contactor bar which is caused to wipingly engage and disengage the contactor blades.

When the buckle is unlatched and the tongue is withdrawn, then the contactor blades urge the actuator to follow the movement of the tongue and the actuator is then positioned in extended or erect position at the other extreme position. Where the contactor bar wipes the blade contacts, the wiping action cleans the resilient blades of oxidation, moisture and the like, assuring long switch usage and minimum abrupt deflection which materially extends switch life. The contactor blades act as a resilient lever retained by the switch case at one end and resting on the buttress fulcrums to apply a spring bias to the actuator.

By slight modification of the actuator element, a normally closed relationship occurs by the contactor blades both being in engagement with the contactor bar in the erect position and urging the actuator against a stop in the case and in the buckle. Then as the buckle tongue is inserted in the buckle for latching, the actuator is engaged and rotated against the spring bias of the contactor blades and a cam extension of the actuator thereupon disengages the contactor blades from the contactor bar. All other parts of the structure remain the same but the actuation is shifted from normally open to normally closed, as desired.

The switch case is made from a tough non-conducting resin using injection molding for close tolerances. Similarly the actuator element is made of non-conducting resin material and injection molded or cast with good precision. The contactor blades are preferably of a good and tough flat spring-like conductor material such as beryllium copper or phosphor bronze and the contactor bar which passes transverely through the actuator is also a conducting material such as a copper pin or tube. The pivots on the actuator are integral extensions parallel to and offset from the contactor bars and are snapped into corresponding pivot journal openings in the switch case. Such assembly is easily accomplished by reason of the fact that the walls of the case are sufficiently deformable as by gating to allow easy insertion and with elements of the case serving as erection stops as needed.

The detailed construction of the switches of the present invention will be better appreciated as the description proceeds.

SPECIFIC DESCRIPTION

Referring to the drawings and in first particular to the FIG. 1 thereof, the typical visible portion of the low profile switch of the present invention is seen in its use environment in a safety belt buckle 11 into which has been slidably secured the switch case 12 with its entry lead support portion 13 protectively guiding the electrical leads 14 and 15 as they extend generally parallel to webbing (not shown) which is secured to the buckle 11 by passing through the webbing opening 16 in the extension tab 17 (FIG. 2) and the corresponding mating opening defined by the walls 18 and depending skirt-like detents 19 and 20. The case 12 extends into the buckle 11 under the buckle cover or trim plate 21 shown in the form of a push buttom cover allowing access to the push button 22. While the buckle 11 may be variously constructed, the preferred form of buckle 11 is a low profile buckle with a channel frame 23 as shown. At the entry end of the buckle 11, a tongue plate 24 is insertable and removable. The tongue plate 24 is a relatively flat plate having internal latching means and having an outboard slot 25 for the attachment of seat belt webbing (not shown).

Figure 2:
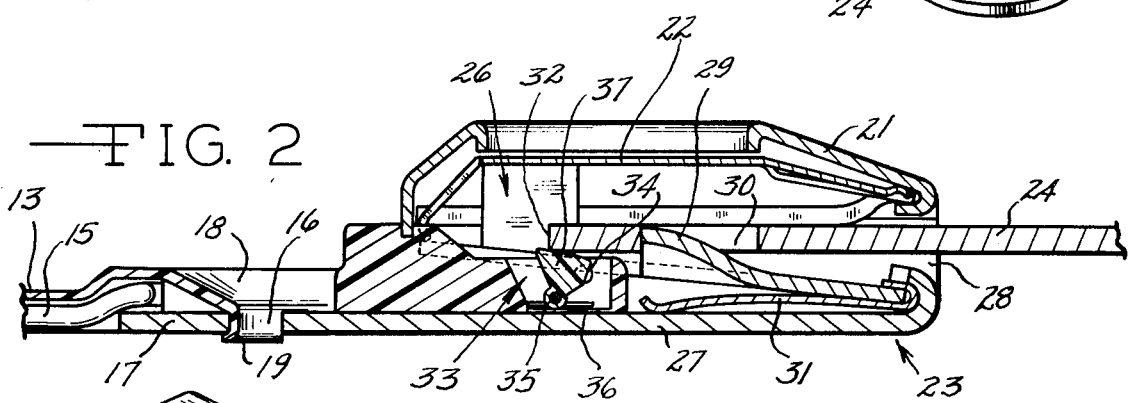
FIG. 2 is a full section elevation view taken on the line 2—2 of FIG. 1 and indicating the condition of switch actuation at full insertion of the tongue element as latched in place.

In FIG. 2 the switch 26 is exposed in the longitudinal cross section in the switch case 12 secured in the buckle 11 by the detent action of the skirt portions 19 and 20 around the outer periphery of the tab extension 17 of the frame 23 and the inner periphery of the opening 16. The cover 21 provides added security for the case 12 by bearing directly on the case after insertion of the case 12. The buckle frame 23 includes a web portion 27 between the two upstanding legs 28. In the buckle 11 is a latch element 29 which is pivotable downwardly by depression of the push button 22 or by entry of the tongue 24 until the latch shoulder opening 30 is aligned with the latch 29. At that point of tongue entry, the spring 31 urges the latch 29 into the locked position against the tongue 24 as shown in FIG. 2 and the tongue 24 cannot be removed until the push button 22 is depressed. On the entry of the tongue 24 in the buckle 11, the tongue 24 guidably moves to the latched position as shown and as it does so the nose 32 of the tongue engages the actuator element 33 in its erected position and rotates the actuator 33 around its pivot 34 to the depressed position as indicated. As this occurs, the contactor bar 35 engages both blades 36 of the switch 33 thereby closing a circuit across the leads 15 and 14. The blades 36 are in electrical contact with respective of the leads 14 and 15 as by crimping, soldering or other well known means. The depression of the blades 36 as shown in FIG. 2 lasts until the tongue 24 is withdrawn from the buckle 11 as by the depression of the push button 22 and latch element 29. Then the blades 36 act like springs returning the actuator 33 of the switch 26 to the erect position, first in a wiping sliding engagement with the contactor bar 35 and finally bearing against the resin actuator body 37, normally open. As will be appreciated, by a simple change in the actuator body 37 the switch 26 is convertible to a normally closed switch.

Figure 3:
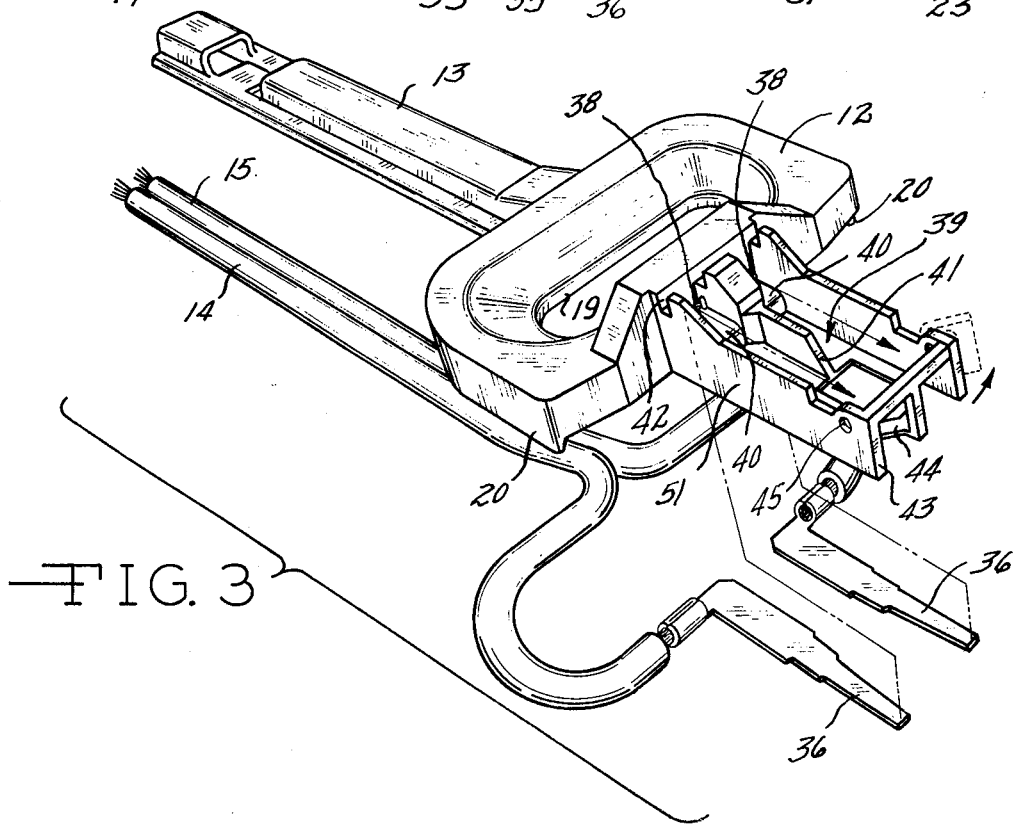
FIG. 3 is an exploded perspective view of the resin switch case, leads, and lead contactors and indicating the gating of the switch actuator support portion for assembly.
Figure 4:
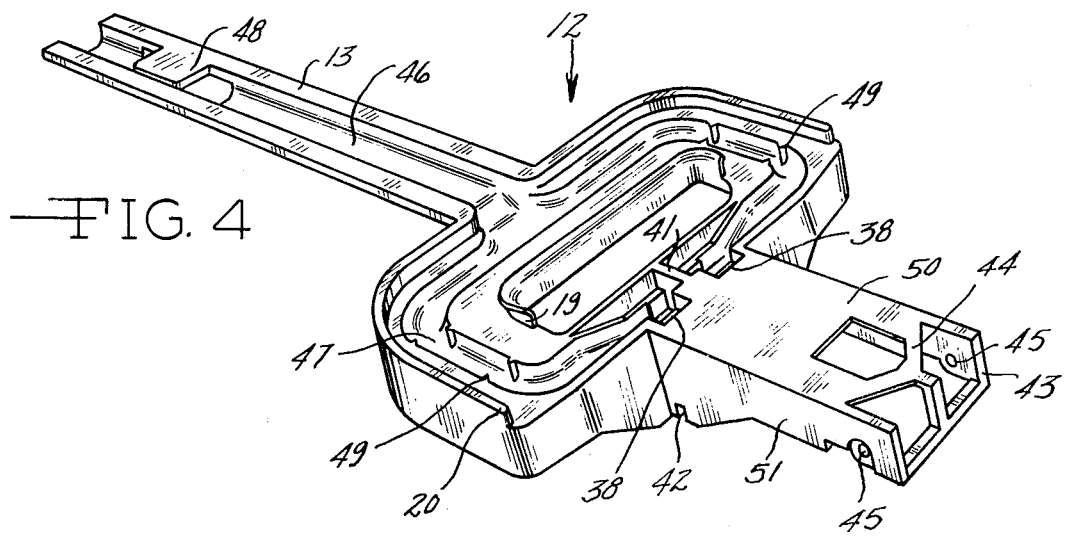
FIG. 4 is a perspective view of the switch case and indicating the integral molded features of the resin switch case including wire lead support tabs and wrappers and webbing slot retaining flanges.

In FIG. 3 the switch encasement 12 is better understood in an exploded perspective and indicating that the switch blades 36 are secured to the switch terminal ends of the leads 14 and 15 and the leads 14 and 15 are nested in the lead entry support extension 13 and in the lead cavity of the case 12. The contactor blades 36 are extended through openings 36 paralleling the longitudinal center line through the case and are thus projected into the switch cavity 39 in a generally horizontal projected way as indicated by the assembly arrows and the blades 36 are supported in this position by the buttresses 40 which provide, as will be seen, fulcrums for the parallel blades 36 and allowing them to provide the dual function of a spring and a pair of contacts. The switch encasement thus comprises a lead entry and support portion 13; a contactor support portion in form of openings 38 and buttresses 40; and the actuator support portion in the cavity 39. The latter function is served when the contactor bar 35 bridges the two blade contacts 36. The blade contacts 36 are separated from contact with each other by the case integral center wall and barrier 41 and the groove 42 across the top of the case 12 provides a seat for the cover 21 of the buckle 11. Thus the blades 36 are cantilever mounted in the case 12 and their free ends project into the cavity 39 in spring contact with the actuator 33. As will be appreciated in FIG. 3, the tip end 43 of the case 12 is gated for displacement at assembly (phantom line) by discontinuous resin and by membranes 44 to allow for the assembly insertion of the actuator 33 with pivots 34 in the journal openings 45. The molding of the encasement 12 provides high precision dimensional control and high unit production providing adequate flexural character for assembly and disassembly of the actuator 33 in the case 12. In FIG. 4 the underside of the case 12 is shown and longitudinal channel 46 for the electrical leads and the lead retaining cavities 47 to the extension of the barrier 41 is clearly visible along with a showing of the lead retaining tab 48 and the lead detents 49 which serve to retain the leads 14 and 15 in the cavities 46 and 47 against chance displacement and the openings 38 through the floor 50 in the switch case 12 are best appreciated. The construction revealed in FIG. 4 is the entire switch encasement 12 as integrally produced in high impact resin by injection molding, for example.

Figures 5, 6:
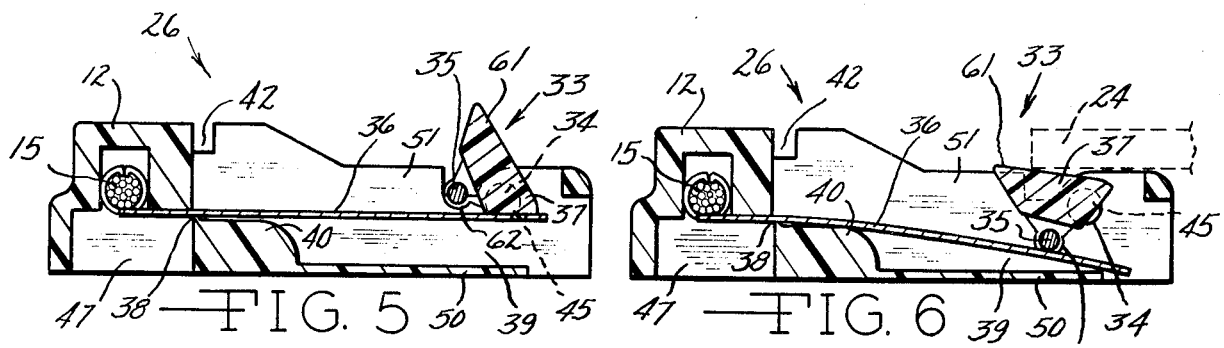
FIG. 5 is a fragmental cross section view through the actuator portion of the switch case and showing the actuator pivotally supported thereby and wherein the actuator is of the normally open type.
FIG. 6 is a view substantially as shown in FIG. 5 but indicating the rotation of the actuator by the tounge at entry and thereby closing the switch in a wiping action which depresses the lead contactors.
Figure 9:
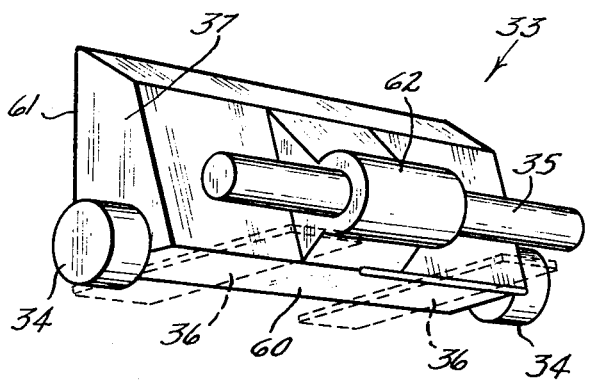
FIG. 9 is a perspective view showing the actuator as used in the normally open switch of FIGS. 5 and 6 with the lead contactors in phantom line at rest.

FIGS. 5 and 6 and 9 show the normally open form of the switch of the present invention. In FIGS. 5 and 6 the structure is slightly stylized to indicate function. In FIG. 5 the actuator 33 is in erect normal position between the walls 51 of the switch cavity 39 prior to engagement with the tongue 24. The flat base 60 of the actuator 33 rests on the blades 36 and is stabilized thereby, the contactor bar 35 being well out of contact with the blade 36 by the cam relationship of the actuator 33 on its pivot 34. The blades 36 extend substantially horizontally resting on the buttresses 40. On entry of the tongue 24 (FIG. 6) the actuator rotates on its pivot 34 against the spring bias of the blades 36 and the contactor bar 35 wipably and slidably engages the blades 36 and contact is maintained thereby between the leads 14 and 15 so long as the tongue 24 remains latched in place. Upon release of the tongue 24 and removal of the actuator 33 follows the removal as urged by the blades 36 acting eccentrically on the actuator 33 around the pivot 34 in the journals 45 and the normal condition of switch 26 is restored. In FIG. 9 the actuator 33 is shown greatly enlarged to illustrate the form of the actuator as a cam-like structure with the tongue engaging face 61, the pivots 34 extending therefrom in axial alignment and showing the integral bracket 62 supporting the contactor bar 35. The actuator 33 is an injection molded resin part at high precision and the base 60 in engagement with the blades 36 provides a stable stop or resin in the normal position.

Figures 7, 8:
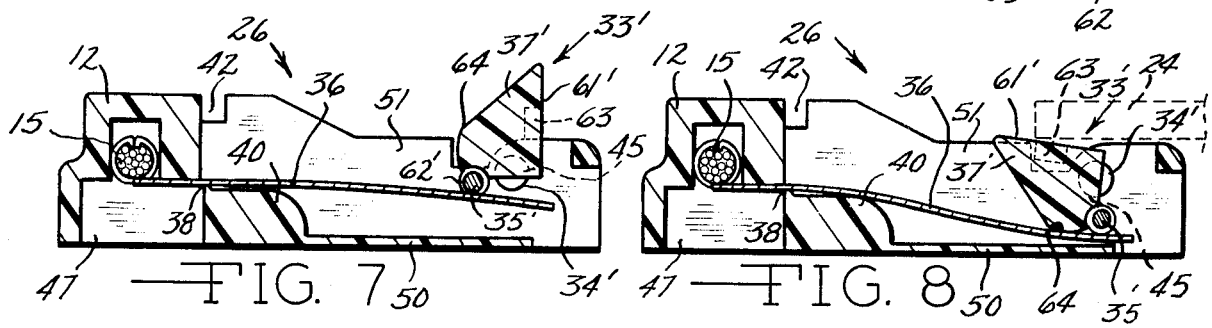
FIG. 7 is substantially the identical structure of FIGS. 5 and 6 but indicating a normally closed actuator.
FIG. 8 is a structure as in FIG. 7 and indicating that the tongue, as it enters the buckle, rotates the actuator depressing the lead contactors and wipingly disengaging electrical contact between lead contactor pairs.
Figure 10:
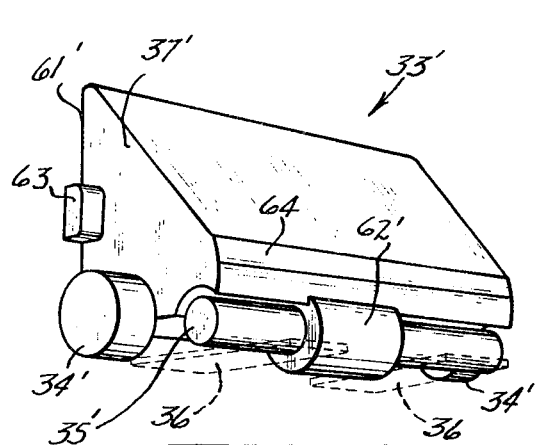
FIG. 10 is a perspective view of the actuator used in the normally closed switch of FIGS. 7 and 8 and showing the lead contactors in rest position in phantom line against the actuator contactor bar.

FIGS. 7, 8 and 10 pertain to the normally closed actuator 33' and the body 37' is molded from resin stock. The integral pivots 34' extend outboard from the body 37' on a common axis for pivotal mounting in the journal openings 45 in the switch case 12. The contactor bar 35' is supported by a bracket 62' in an eccentric position with respect to the pivotal axis and it will be noticed that when the actuator 33' is in the erect position (FIG. 7) the contactor bar 35' engages the blades or leaves 36 and the stop lug 63 rests on the case 12 preventing further rotation in a clockwise direction as shown in FIG. 7. In this normal position current can pass between the two blades 36 and their respective leads 14 and 15. The tongue engaging face 61' is erect in an interface position with respect to the guided insertion of the tongue 24. In FIG. 8, the tongue 24 has entered the buckle 11 and pivoted the actuator 33' counterclockwise, as shown, on the pivot 34'. This action causes corresponding rotation of the contactor bar 35' with a wiping sliding action on the blades 36 until the cam-like lobe 64 engages the blades 36 and urges the blades 36 out of engagement with the contactor bar 35' as shown in the FIG. 8. This opens the circuit between the blades 36 and their respective leads 14 and 15. Upon removal of the tongue 24 the condition shown in FIG. 7 is restored as a consequence of the spring following function of the blades 36 which erects the actuator 33' and wipingly reengages the contactor bar 35' with the blades 36.

The buckle switches 26, thus described as normally open and normally closed, are easily mass produced and adapted for attachment to a wide variety of styles of buckle where an interference actuation is sought by engagement with the buckle tongue. The contactor blades perform as springs and the order of necessary spring strength is low and the flexure in the blades is low and gradual assuring long and trouble-free life. The wiping action as between contactor and blades assures self-cleaning without unusual wear. The switch case 12 is adapted for use in two types of switches and assembly is simplified and machining is substantially eliminated after trimming the parts from the dies and molds. Those skilled in the switch art will immediately perceive the substantial advantages of the instant switch as applied to automotive electrical systems having seat belt signals and interlocks. Having thus described my invention and the operative embodiment thereof, others skilled in the art will appreciate other changes, improvements and modifications and such changes, improvements and modifications are intended to be included herein when embraced by the spirit of the hereinafter appended claims.

I claim:

1. A switch for seat buckles of the type including a channel frame and an insertable tongue, latched upon closure, the combination including:
    a resin switch case having a lead entry portion, a lead support portion, lead contactor support portion, and an actuator support portion;
    a pair of electrical leads supported in said entry portion of said encasement and extending through said lead support portion and to said lead contactor support portion;
    a pair of flat spring resilient lead contactors electrically connected to said leads and extending into said actuator support portion of said encasement;
    a non-conducting actuator in said actuator support portion of said encasement and journalled in said encasement, one profile of said actuator extending above said actuator support portion in an interference path with said tongue and another profile of said actuator resiliently supported by said lead contactors; and
    a contactor bar through said actuator eccentric to the pivot axis of said actuator and movable with said actuator in a path selectively intersecting and wiping said lead contactors with said bar.

2. A low profile switch for safety belt buckles comprising:
    a switch case slidable into a safety belt buckle;
    a pair of electrical leads secured into said case and oriented thereby;
    a pair of flat spring resilient contactor blades connected to said leads and extending through said switch case in parallel fulcrum support into a switch cavity defined by said case;

an actuator element pivotally supported in said switch cavity and urged by contact with said blades to an erected position;

a contactor bar through said actuator element eccentric with respect to the pivotal axis of said actuator and said bar upon pivotal movement of said actuator wipingly and slidably engaging said blades; and a tongue element engageable and disengageable in said buckle which, upon insertion into said buckle, pivots said actuator from its erect position and depresses said contactor blades.

* * * * *

UNITED STATES PATENT OFFICE
CERTIFICATE OF CORRECTION

Patent No. 4,060,878　　　　　　　　　Dated　1977 December 6

Inventor(s) Joseph J. Dyki

It is certified that error appears in the above-identified patent and that said Letters Patent are hereby corrected as shown below:

Column 2, line 45, "suport" should be --- support ---

Column 3, line 67, "buttom" should be --- button ---

Column 4, line 50, "36" should be --- 38 ---

Column 5, line 64, "interface" should be --- interference ---

Column 6, line 29, "embodiment" should be --- embodiments ---

Signed and Sealed this

Twenty-eighth Day of March 1978

[SEAL]

*Attest:*

RUTH C. MASON
*Attesting Officer*

LUTRELLE F. PARKER
*Acting Commissioner of Patents and Trademarks*